(12) United States Patent
Firek et al.

(10) Patent No.: US 9,964,171 B2
(45) Date of Patent: May 8, 2018

(54) DAMPER ASSEMBLY

(71) Applicant: BeijingWest Industries Co., Ltd., Beijing (CN)

(72) Inventors: Lukasz Karol Firek, Krakow (PL); Radoslaw Pawel Grzesik, Krakow (PL); Piotr Andrzej Flacht, Krakow (PL); Pawel Edward Kus, Krakow (PL)

(73) Assignee: BeijingWest Industries Co., Ltd., Beijing (CN)

( * ) Notice: Subject to any disclaimer, the term of this patent is extended or adjusted under 35 U.S.C. 154(b) by 0 days. days.

(21) Appl. No.: 15/329,350

(22) PCT Filed: Dec. 25, 2014

(86) PCT No.: PCT/CN2014/094920
§ 371 (c)(1),
(2) Date: Jan. 26, 2017

(87) PCT Pub. No.: WO2016/049985
PCT Pub. Date: Apr. 7, 2016

(65) Prior Publication Data
US 2017/0219043 A1    Aug. 3, 2017

Related U.S. Application Data

(60) Provisional application No. 62/058,242, filed on Oct. 1, 2014.

(51) Int. Cl.
*F16F 13/00* (2006.01)
*F16F 9/49* (2006.01)
(Continued)

(52) U.S. Cl.
CPC .............. *F16F 9/49* (2013.01); *F16F 9/5126* (2013.01); *F16F 9/585* (2013.01); *F16F 2222/12* (2013.01); *F16F 2224/025* (2013.01)

(58) Field of Classification Search
CPC ........ F16F 9/44; F16F 9/48; F16F 9/49; F16F 9/348; F16F 9/3487; F16F 9/3488; F16F 9/585
(Continued)

(56) References Cited

U.S. PATENT DOCUMENTS 2,729,308 A * 1/1956 Koski ................. F16F 9/48
137/513.5
3,833,248 A * 9/1974 Wossner ............ B60R 19/32
188/282.9

(Continued)

FOREIGN PATENT DOCUMENTS

CN    1113298 A    12/1995
EP    3040577 A1    7/2016
(Continued)

OTHER PUBLICATIONS

International Search Report; dated Jun. 17, 2015; two (2) pages.
(Continued)

*Primary Examiner* — Christopher P Schwartz
(74) *Attorney, Agent, or Firm* — William H. Honaker; Dickinson Wright PLLC (57) ABSTRACT

A damper assembly (20) is disclosed, and it comprises: a first rube (22) defining an inner surface (24) extending along an axis (A) to define a fluid chamber (30) containing a damping fluid (32); a rod (34) extending axially in the first rube (22); a guide (40) annularly disposed about the rod (34) and engaging the first tube (22); a piston (42) and a retainer (46) which are attached to the rod (34) and are slidably disposed in the first tube (22); a first spring (50) engaging and extending axially away from the retainer (46); a valve body (52) which is disposed adjacent to the first spring (50) and has a periphery (54) spaced from the inner surface (24) of the first tube (22) to define an annular channel (60); a second spring (66) extending axially away from the valve
(Continued)

body (52); a bumper (68) engaging the second spring (66). The valve body (52) moves into sealing engagement with the retainer (46) in response to the bumper (68) engaging the guide (40). This causes the damping fluid (32) to move exclusively through the valve body (52) providing additional damping force.

17 Claims, 8 Drawing Sheets

(51) Int. Cl.
*F16F 9/512* (2006.01)
*F16F 9/58* (2006.01)

(58) Field of Classification Search
USPC ...... 188/280, 282.1, 282.5, 282.8, 284, 315, 188/322.15
See application file for complete search history.

(56) References Cited

U.S. PATENT DOCUMENTS

| | | | | |
|---|---|---|---|---|
| 4,328,960 A | * | 5/1982 | Handke | F16F 9/49 188/284 |
| 5,219,414 A | * | 6/1993 | Yamaoka | F16F 9/48 188/284 |
| 5,501,438 A | * | 3/1996 | Handke | F16F 9/49 267/221 |
| 6,681,906 B1 | * | 1/2004 | Sasse | F16F 9/49 188/282.6 |
| 8,132,654 B2 | * | 3/2012 | Widla | F16F 9/3487 188/315 |
| 8,245,823 B2 | * | 8/2012 | Zeissner | F16F 1/328 188/322.15 |
| 8,919,505 B2 | * | 12/2014 | Slusarczyk | F16F 9/512 188/282.5 |
| 2002/0027051 A1 | | 3/2002 | Grundei | |
| 2008/0277218 A1 | * | 11/2008 | Fox | F16F 9/44 188/314 |
| 2010/0078275 A1 | * | 4/2010 | Kazmirski | F16F 9/512 188/280 |
| 2015/0204411 A1 | * | 7/2015 | Kus | F16F 9/49 188/313 |

FOREIGN PATENT DOCUMENTS

JP  1096441  4/1998
WO  2014085954 A1  6/2014

OTHER PUBLICATIONS

First Office Action dated Dec. 27, 2017 for counterpart Japanese application No. 2017-508605, 9 pages.
Extended Search Report dated Mar. 14, 2019 for counterpart European Application No. EP 14903066.0, 9 pages.

\* cited by examiner

DAMPER ASSEMBLY

CROSS REFERENCE TO RELATED APPLICATION

This application claims the benefit of PCT International Application Serial No. PCT/CN2014/094920 filed on Dec. 25, 2014, which claims priority to U.S. Provisional Patent Application 62/058,242 filed on Oct. 1, 2014, and entitled "Damper Assembly," the entire disclosures of each of which are incorporated by reference.

BACKGROUND OF THE INVENTION

1. Field of the Invention

A damper assembly for damping oscillations of a component of a vehicle suspension.

2. Description of the Prior Art

The damper assemblies of the type to which the subject invention pertains attach to a vehicle frame and to a suspension component for damping effects of the vehicle traveling over uneven terrain and control the motion of the component in relation to the vehicle frame. One such damper assembly is illustrated in US2002/0027051 to Grundei on Mar. 7, 2002 wherein a first tube has a generally tubular shape that defines an inner surface. The first tube extends along an axis from an open upper portion to a closed lower portion to define a fluid chamber containing a damping fluid. A rod extends axially between a first end exteriorly of the first tube and a second end interiorly of the first tube. A guide is annularly disposed about the rod and engages the upper portion of the first tube for aligning the rod and sealing the damping fluid in the first tube. A piston defines a plurality of openings and is attached to the second end of the rod and is slidably disposed in the first tube. The piston is moveable toward the upper portion of the first tube in a rebound stroke and is moveable toward the lower portion of the first tube in a compression stroke. A valve seat is disposed in the first tube and extends radially outwardly from the axis. A first spring is disposed in the first tube and engages and extends axially away from the valve seat. A valve body is annularly disposed about the axis in the first tube adjacent to the first spring. The valve body has a periphery and a top and a bottom and defines a plurality of bores extending axially through the valve body from the top to the bottom. A second spring is disposed in the first tube and extends axially away from the top of the valve body toward the upper portion of the first tube. A bumper is disposed in the first tube and engages the second spring for compressing the second spring as the bumper moves axially in the first tube toward the lower portion of the first tube. However, the valve bodies of such damper assemblies inherently affect the damping force provided by the damper assembly over the entire stroke of the piston within the first tube and therefore may be more difficult to tune and obtain the most desirable damping characteristics for a given damper assembly application.

Damping forces provided by damper assemblies are primarily dependent upon two factors, the speed of the piston and rod and the amount of travel of the rod and piston. The damping force generated by prior art damping assemblies is only related to the speed of the rod and piston. It would thus be desirable to provide a solution which includes a damper assembly in which operation of the valve body is more tunable and is dependent on the position of the rod and piston in the first tube.

Additionally, other prior art damper assemblies may include jounce cushions disposed at one or both ends of the first tube for extreme movement of the piston within the first tube. These cushions slow or stop the movement of the piston at the end of its stroke and absorb energy and shock associated with this movement. For example, a jounce cushion may be attached to the guide to slow or stop the movement of the piston at the end of the rebound stroke. While it is important to prevent contact by the piston at the end of the compression stroke or the rebound stroke, these cushions are not ideal for safety and durability of the damper assembly. Therefore, there remains a need for a damper assembly that provides a more durable solution to slowing or stopping piston movement at the end of its stroke.

SUMMARY OF THE INVENTION

The invention provides for such a damper assembly wherein the periphery of the valve body is spaced from the inner surface of the first tube to define an annular channel for allowing the damping fluid to bypass the valve body. The valve body moves into sealing engagement with the valve seat in response to the bumper compressing the second spring. This moves the valve body toward the lower portion of the first tube and into engagement with the valve seat which causes the damping fluid flowing through the annular channel to travel exclusively through the bores of the valve body which provides additional damping force.

Advantages of the Invention

Thus several advantages of one or more aspects of the subject invention are that the valve body operation is dependent on the position of the rod and the piston in the first tube. This assures proper energy dissipation of the movement of the rod and piston at the end of their stroke and helps to yield a damper assembly capable of safer and more comfortable operation. The damping characteristics may also be tuned more easily because the valve body primarily affects the damping characteristic of the damper assembly as the piston nears the end of its rebound stroke or compression stroke within the first tube.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Referring to the Figures, wherein like numerals indicate corresponding parts throughout several views, a damper assembly 20 constructed in accordance with the subject invention is shown in the Figures. In the enabling embodiments, the damper assembly 20 is used as part of a vehicle suspension for damping effects of the vehicle traveling over uneven terrain. However, it should be appreciated that the damper assembly 20 could be used for damping any other various movement or oscillations of components to which it may be attached.

The damper assembly, generally shown at 20, comprises a first tube 22 having a generally tubular shape and defining an inner surface 24. The first tube 22 extends along an axis A from an open upper portion 26 to a closed lower portion 28 to define a fluid chamber 30 containing a damping fluid 32. A rod 34 extends axially between a first end 36 exteriorly of the first tube 22 and a second end 38 interiorly of the first tube 22. A guide 40 is annularly disposed about the rod 34 and engages the upper portion 26 of the first tube 22 for aligning the rod 34 and sealing the damping fluid 32 in the first tube 22. A piston 42 defines a plurality of openings 44 and is attached to the second end 38 of the rod 34. The piston 42 is slidably disposed in the first tube 22 and is moveable toward the upper portion 26 of the first tube 22 in a rebound stroke. The piston 42 is also moveable toward the lower portion 28 of the first tube 22 in a compression stroke. A valve seat 46, 48 is disposed in the first tube 22 and extends radially outwardly from the axis A. A first spring 50 is disposed in the first tube 22 and engages and extends axially away from the valve seat 46, 48.

A valve body 52, generally indicated, is annularly disposed about the axis A in the first tube 22 adjacent to the first spring 50. The valve body 52 has a periphery 54 and a top 56 and a bottom 58. The periphery 54 of the valve body 52 is spaced from the inner surface 24 of the first tube 22 to define an annular channel 60 for allowing the damping fluid 32 to bypass the valve body 52. The valve body 52 also defines a plurality of bores 62, 64 extending axially through the valve body 52 from the top 56 to the bottom 58. A second spring 66 is disposed in the first tube 22 and extends axially away from the top 56 of the valve body 52 toward the upper portion 26 of the first tube 22. A bumper 68 is disposed in the first tube 22 and engages the second spring 66.

Figure 4:
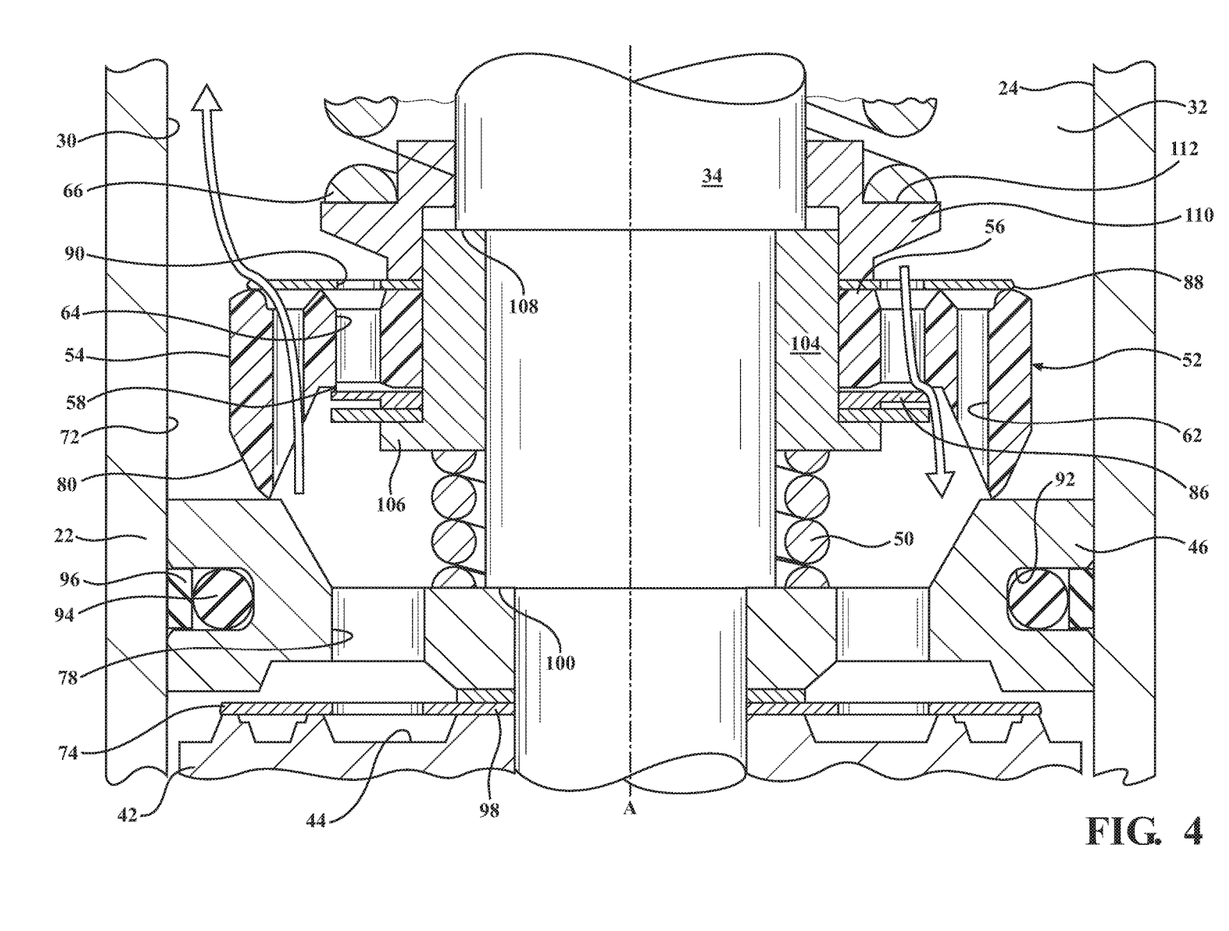
FIG. 4 is an enlarged cross-sectional view of the first embodiment of the damper assembly illustrating the valve body in sealing engagement with the retainer.
Figure 5:
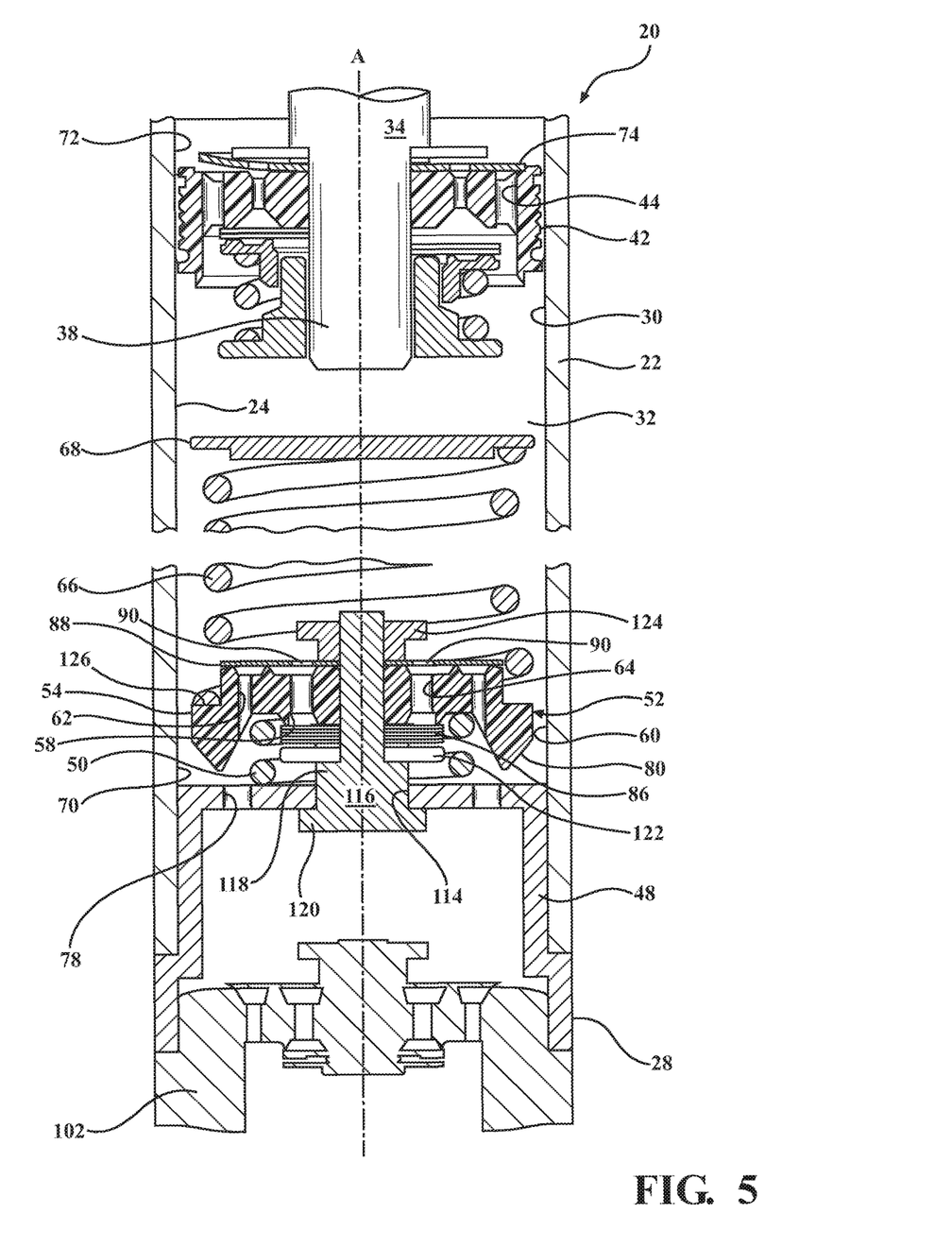
FIG. 5 is a cross-sectional view of the second embodiment of the damper assembly.
Figure 6:
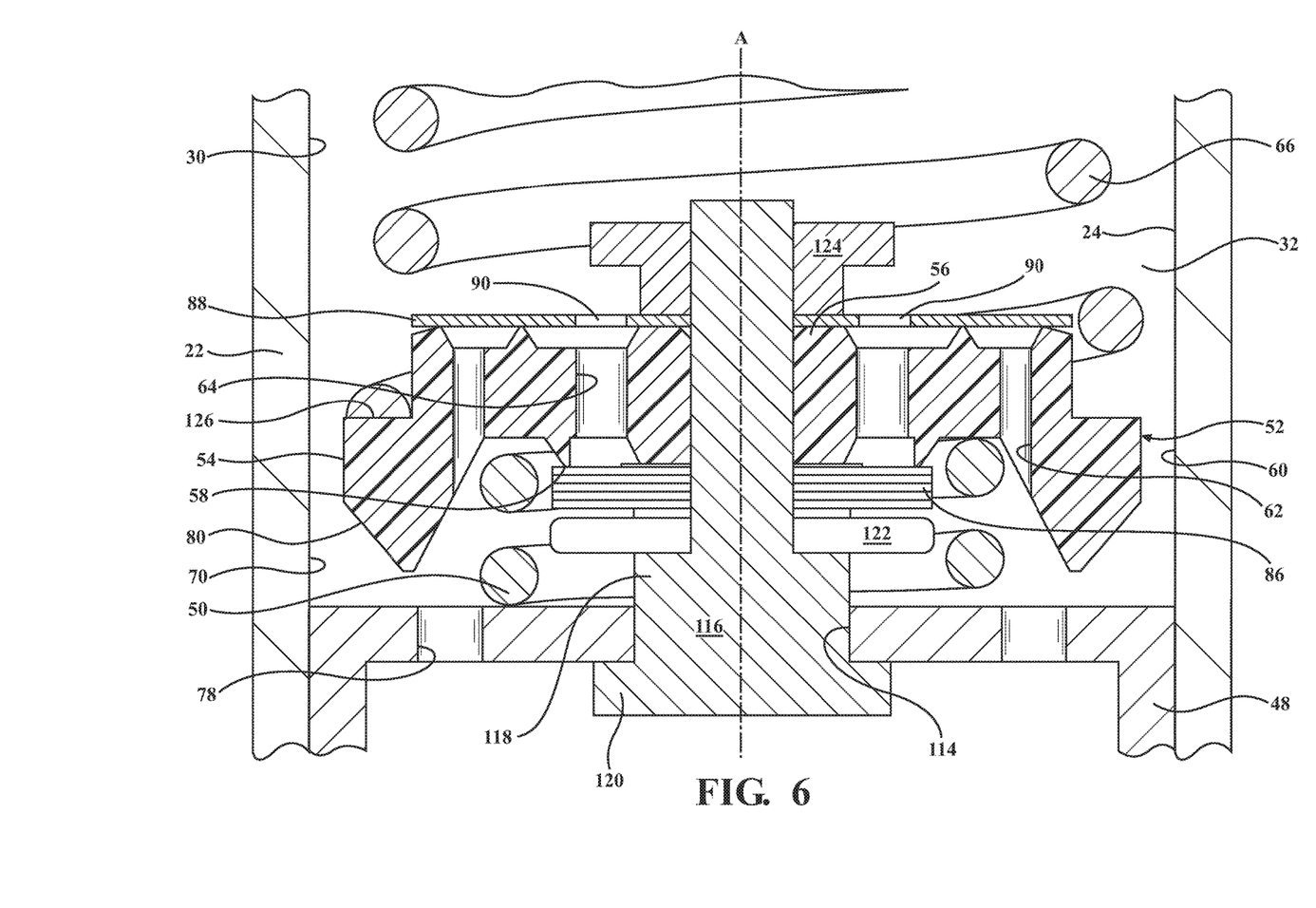
FIG. 6 is an enlarged cross-sectional view of the second embodiment of the damper assembly.
Figure 8:
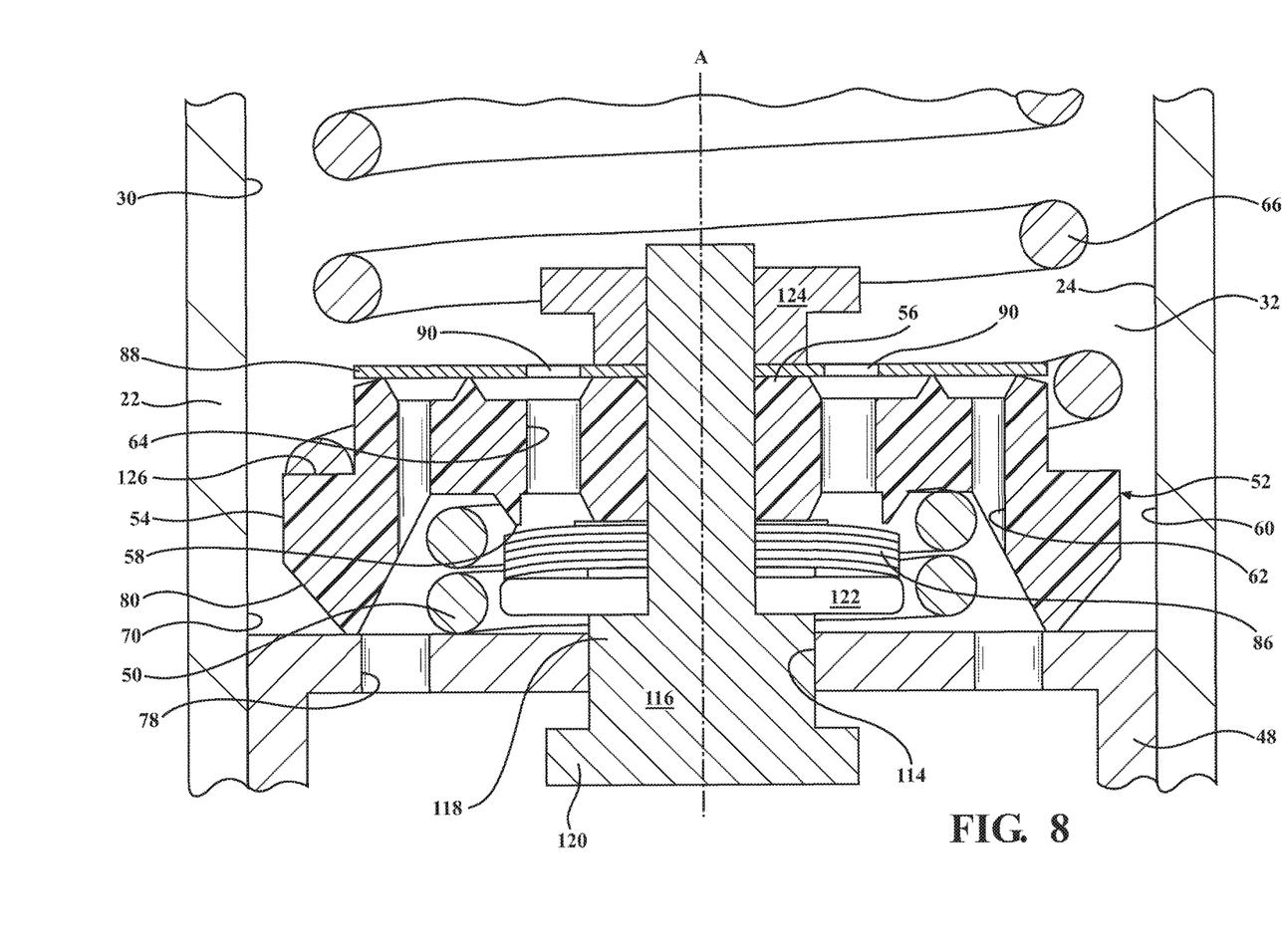
FIG. 8 is an enlarged cross-sectional view of the second embodiment of the damper assembly illustrating the valve body in sealing engagement with the insert.

In operation, the bumper 68 compresses the second spring 66 as the bumper 68 moves axially in the first tube 22 toward the lower portion 28 of the first tube 22. The valve body 52 moves into sealing engagement with the valve seat 46, 48 in response to the bumper 68 compressing the second spring 66. This causes axial movement of the valve body 52 toward the lower portion 28 of the first tube 22 and into engagement with the valve seat 46, 48 which causes the damping fluid 32 flowing through the annular channel 60 to travel exclusively through the bores 62, 64 of the valve body 52 (FIGS. 4 and 8). This restriction of flow of the damping fluid 32 through the bores 62, 64 of the valve body 52 provides additional damping force compared to when the damping fluid 32 is allowed to flow around the valve body 52 through the annular channel 60.

The piston 42 of the damper assembly 20 divides the fluid chamber 30 into a compression chamber 70 with the lower portion 28 and a rebound chamber 72 with the guide 40 in the upper portion 26. The openings 44 of the piston 42 extend through the piston 42 parallel to the axis A for allowing the damping fluid 32 to flow through the piston 42 between the compression chamber 70 and the rebound chamber 72. Although these openings 44 extend parallel to the axis A in the disclosed embodiments, it should be appreciated that the openings 44 do not necessarily have to extend parallel to the axis A. The piston 42 in the preferred embodiments includes at least one regulator plate 74 biased against the openings 44 and disposed annularly about the rod 34 for controlling flow of the damping fluid 32 through the piston 42. However, it should be appreciated that other embodiments may not include a regulator plate 74.

Figure 1:
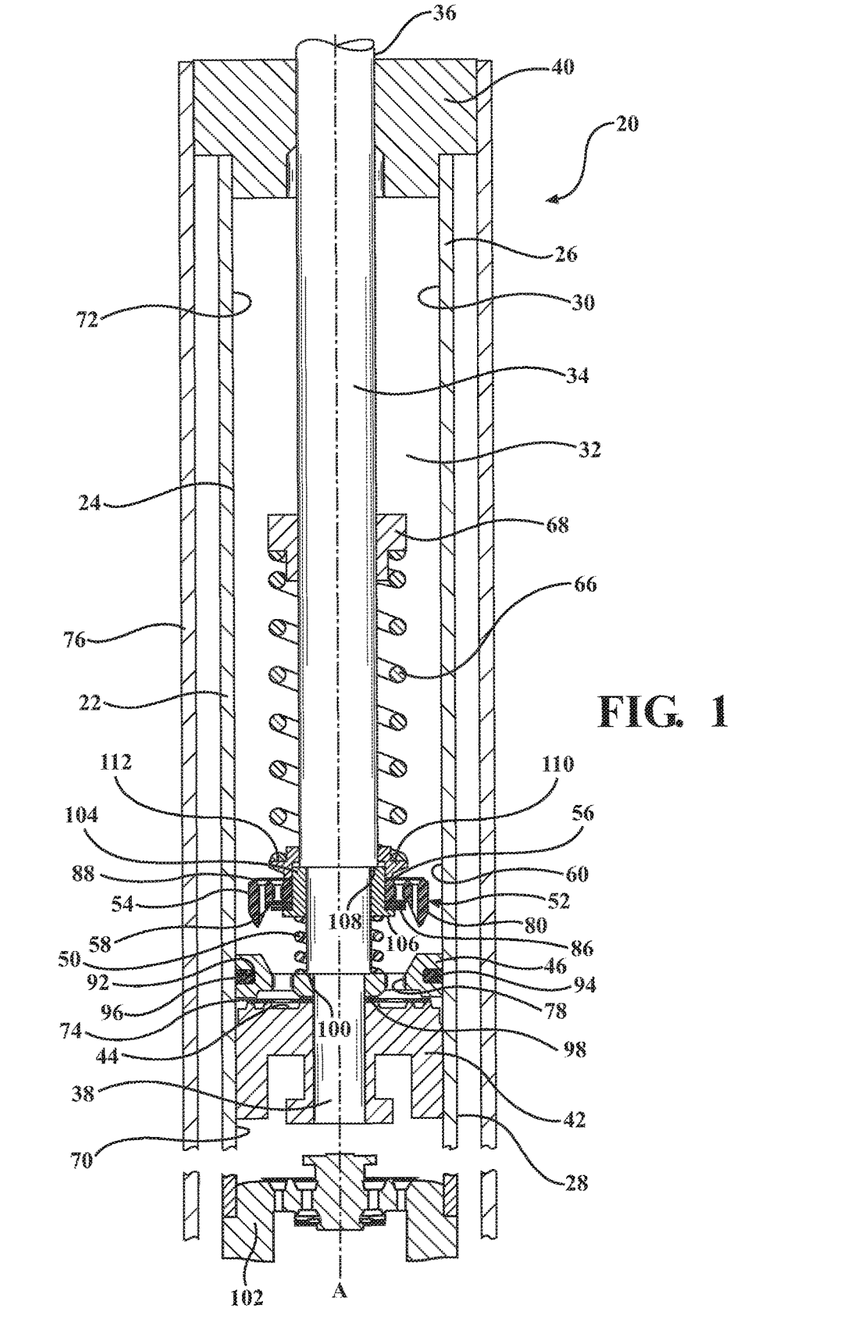
FIG. 1 is a cross-sectional view of the first embodiment of the damper assembly.
Figure 2:
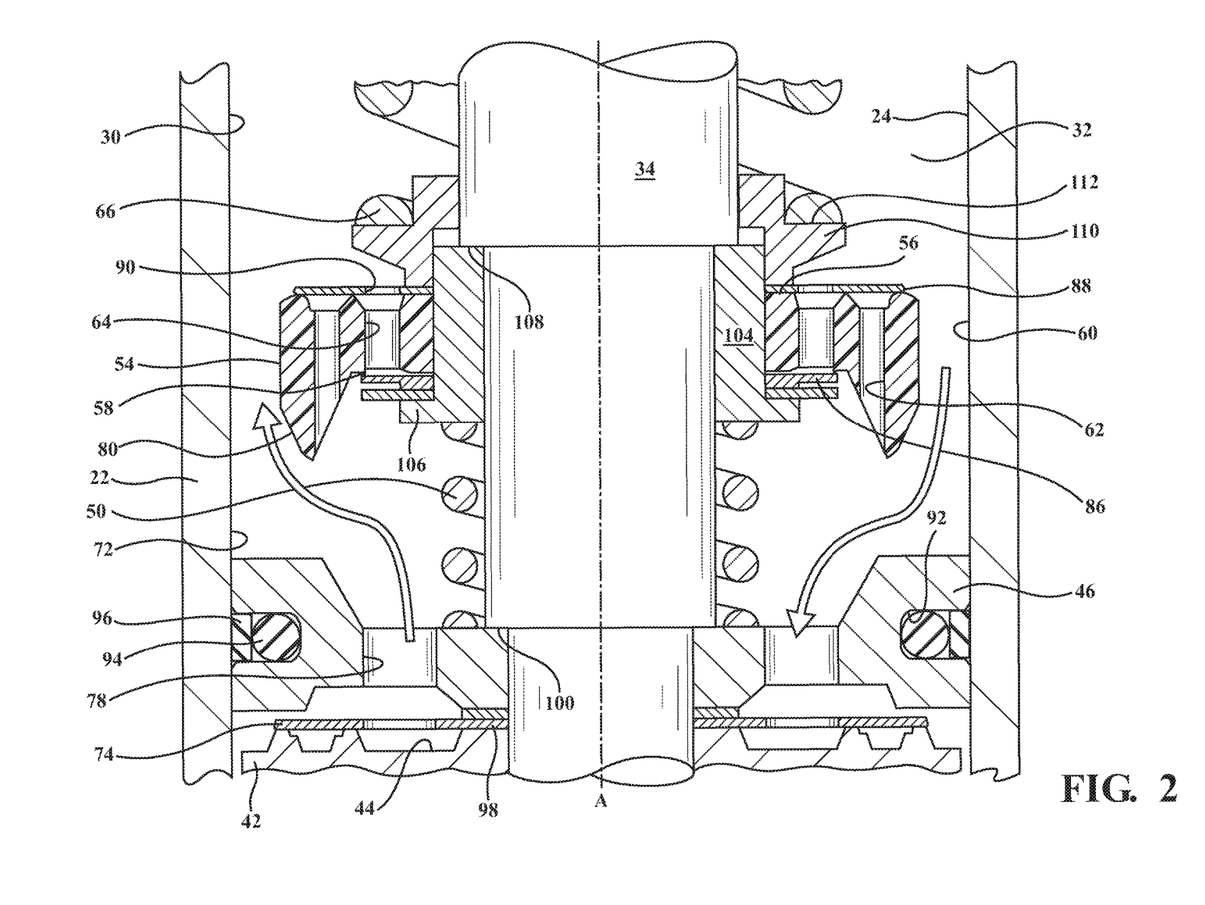
FIG. 2 is an enlarged cross-sectional view of the first embodiment of the damper assembly.
Figure 3:
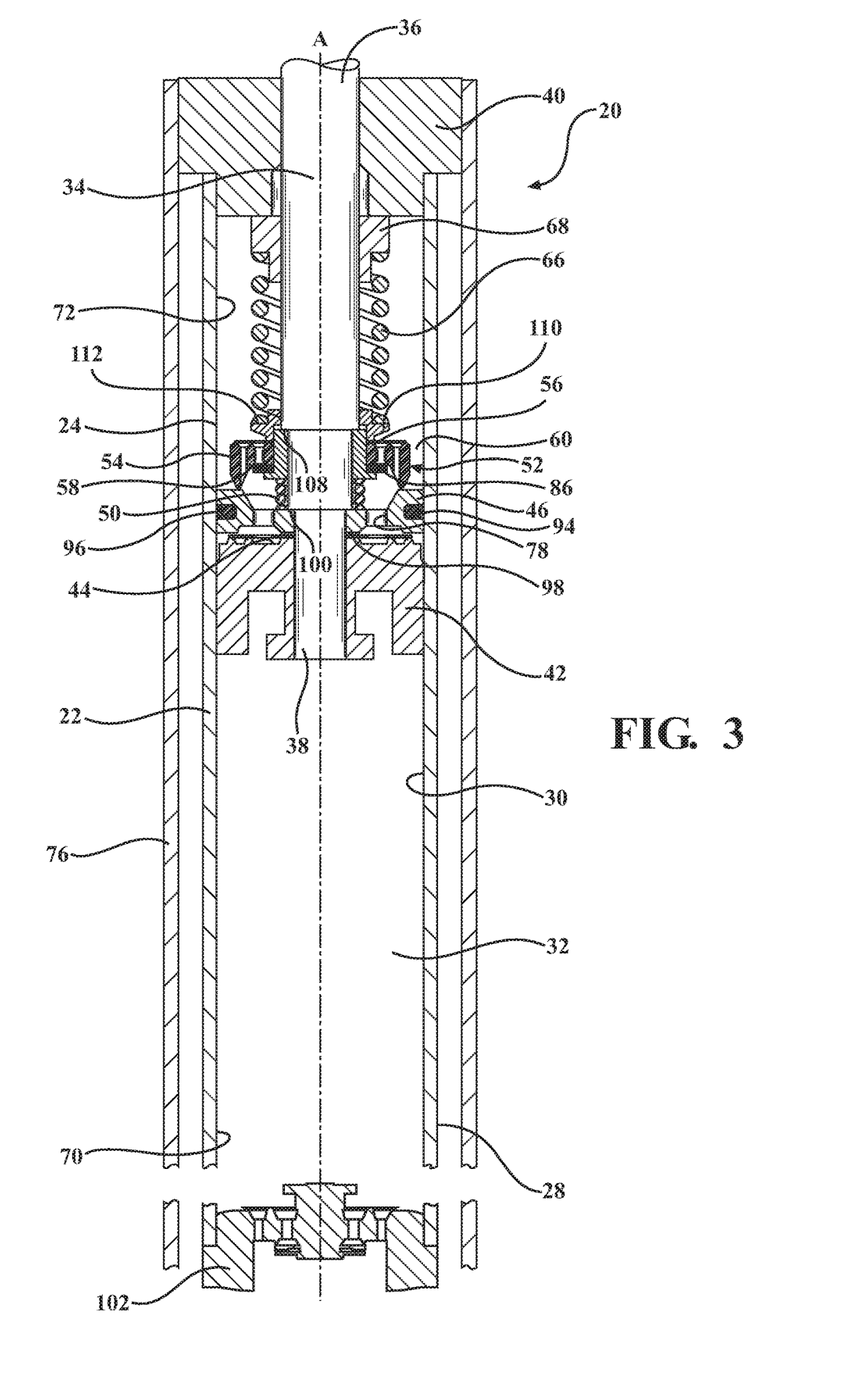
FIG. 3 is a cross-sectional view of the first embodiment of the damper assembly illustrating the valve body in sealing engagement with the retainer.

Additionally, as best shown in FIGS. 1 and 3, the damper assembly 20 includes a second tube 76 having a generally tubular shape that extends along the axis A concentrically about the first tube 22. While the damper assembly 20 may be a twin-tube configuration, it can also take the form of a mono-tube damper instead.

The valve seat 46, 48 of the damper assembly 20 defines a plurality of passages 78 extending axially through the valve seat 46, 48 to allow the damping fluid 32 to flow through the valve seat 46, 48. The valve body 52 includes a tapered part 80 extending axially away from the bottom 58 at the periphery 54 which is shaped to sealingly engage the valve seat 46, 48. Although embodiments of the subject invention which are disclosed illustrate the valve body 52 with a very specific cross-section which includes a tapered part 80, it should be appreciated that other embodiments may accomplish the engagement and sealing of the valve body 52 against the valve seat 46, 48 in other ways such as, but not limited to an axial extension of the valve seat 46, 48 that would allow sealing engagement of the valve seat 46, 48 with the valve body 52.

The bores 62, 64 of the valve body 52 extend axially through the valve body 52 parallel to the axis A. As with the openings 44 of the piston 42, it should be appreciated that the bores 62, 64 do not necessarily have to extend parallel to the axis A. The bores 62, 64 of the valve body 52 include a plurality of intake bores 62 disposed circumferentially about the axis A on an outer diameter and extending axially through the valve body 52. The bores 62, 64 of the valve body 52 also include a plurality of deflection bores 64 disposed circumferentially about the axis A on an inner diameter and extending axially through the valve body 52. The inner diameter is disposed radially inwardly from the outer diameter.

A plurality of deflection discs 86 are disposed annularly about the axis A and extending radially from the axis A over the deflection bores 64 on the bottom 58 of the valve body 52. The deflection discs 86 flex away from the bottom 58 and away from the deflection bores 64 in response to a first pressure differential from the top 56 of the valve body 52 to the bottom 58 of the valve body 52 as the tapered part 80 of the valve body 52 engages the valve seat 46, 48.

At least one intake disc 88 is disposed annularly about the axis A on the top 56 of the valve body 52 and extends radially from the axis A to cover the intake bores 62 of the valve body 52. The intake disc 88 flexes away from the top 56 and from the intake bores 62 in response to a second pressure differential from the bottom 58 of the valve body 52 to the top 56 of the valve body 52 as the tapered part 80 of the valve body 52 engages the valve seat 46, 48. The intake disc 88 defines a plurality of intake orifices 90 disposed circumferentially about the axis A and extending axially through the intake disc 88 and axially aligned with the deflection bores 64. The intake orifices 90 allow the damping fluid 32 flowing through the deflection bores 64 to flow through the intake disc 88 in response to the first pressure differential from the top 56 of the valve body 52 to the bottom 58 of the valve body 52 as the tapered part 80 of the valve body 52 engages the valve seat 46, 48. The damping forces provide by the valve body 52 may be tuned by making adjustments such as, but not limited to changing the size of the bores 62, 64 and changing the number and stiffness of the deflection discs 86 and intake discs 88.

In a first embodiment of the subject invention (FIGS. 1-4), the valve seat 46, 48 comprises a retainer 46 attached to the second end 38 of the rod 34 adjacent to the piston 42. The retainer 46 extends radially outwardly from the rod 34 to the inner surface 24 of the first tube 22 and defines a groove 92 disposed annularly about the retainer 46. An O-ring 94 is annularly disposed about the retainer 46 in the groove 92 and a slide ring 96 is disposed in the groove 92 concentrically about the O-ring 94. The slide ring 96 is in sealing engagement with the inner surface 24 of the first tube 22 for preventing the damping fluid 32 from passing between the retainer 46 and the inner surface 24 of the first tube 22. Although both the O-ring 94 and the slide ring 96 are used to create a seal in the first embodiment, alternative embodiments may, for instance omit the sealing ring, or seal the retainer 46 in another alternative fashion.

The damper assembly 20 of the first embodiment further comprises a spacer 98 disposed between the piston 42 and the retainer 46 to maintain a predetermined distance between the piston 42 and the retainer 46 and to allow flexing of the regulator plate 74 away from the piston 42. The rod 34 further defines a first shoulder 100 abutting the retainer 46 for limiting axial movement of the retainer 46 away from the piston 42. A base valve 102 is disposed adjacent the lower portion 28 of the first tube 22 and extends radially outwardly from the axis A to engage and attach to the first tube 22. It should be appreciated that the damper assembly 20 does not necessarily require a base valve 102 and may alternatively be constructed without a base valve 102.

A sleeve 104 that is generally cylindrically shaped and includes a flange 106 that extends radially outwardly from the rod 34 is slidably disposed about the rod 34 and is axially spaced from the retainer 46. The valve body 52 and the intake disc 88 and the deflection discs 86 are each disposed concentrically about the sleeve 104. A second shoulder 108 is defined by the rod 34 and abuts the sleeve 104 for limiting the axial movement of the valve body 52 away from the retainer 46. The first spring 50 is annularly disposed about the rod 34 and extends axially away from the retainer 46 and the piston 42 and engages the flange 106 of the sleeve 104.

The damper assembly 20 of the first embodiment also includes a clamping nut 110 slidably disposed along the rod 34 and attached to the sleeve 104 opposite the first spring 50 for retaining the intake disc 88 against the top 56 of the valve body 52 and retaining the deflection discs 86 between the flange 106 of the sleeve 104 and the bottom 58 of the valve body 52. The clamping nut 110 defines a clamping nut shelf 112 extending circumferentially about the clamping nut 110. The second spring 66 is concentrically disposed about the rod 34 and engages and extends axially away from the clamping nut shelf 112 along the rod 34, toward the upper portion 26 of the first tube 22. As best shown in FIG. 3, the bumper 68 is slidably disposed about the rod 34 for compressing the second spring 66 as the piston 42 approaches the upper portion 26 of the first tube 22 and causes the bumper 68 to engage the guide 40 to compress the first spring 50 and move the valve body 52 into engagement with the retainer 46 (FIG. 4) during the rebound stroke of the piston 42.

In an alternative second embodiment of the subject invention (FIGS. 5-8), the valve seat 46, 48 comprises an insert 48 having a cup shape and defining a central aperture 114. The insert 48 attaches to the lower portion 28 of the first tube 22. A base valve 102 is disposed adjacent the lower portion 28 of the first tube 22 and extends radially outwardly from the axis A to engage and attach to the insert 48. As with the first embodiment, the damper assembly 20 does not necessarily require a base valve 102 and may alternatively be constructed without one.

The damper assembly 20 of the second embodiment further comprises an axial member 116 having a protrusion 118 and is slidably disposed in the central aperture 114 of the insert 48. The axial member 116 extends axially toward the upper portion 26 of the first tube 22. The axial member 116 also has an annular projection 120 extending radially from the protrusion 118 that engages the insert 48 for limiting axial movement of the axial member 116 toward the upper portion 26 of the first tube 22. The first spring 50 is annularly disposed about the axial member 116 and engages and extends axially away from the insert 48. A washer 122 is also annularly disposed about the axial member 116 and is disposed adjacent to the protrusion 118. The valve body 52 and the intake disc 88 and the deflection discs 86 are each disposed concentrically about the axial member 116. A disc nut 124 is attached to the axial member 116 and engages the intake disc 88 for retaining the intake disc 88 against the top 56 of the valve body 52 and retains the deflection discs 86 between the washer 122 and the bottom 58 of the valve body 52.

Figure 7:
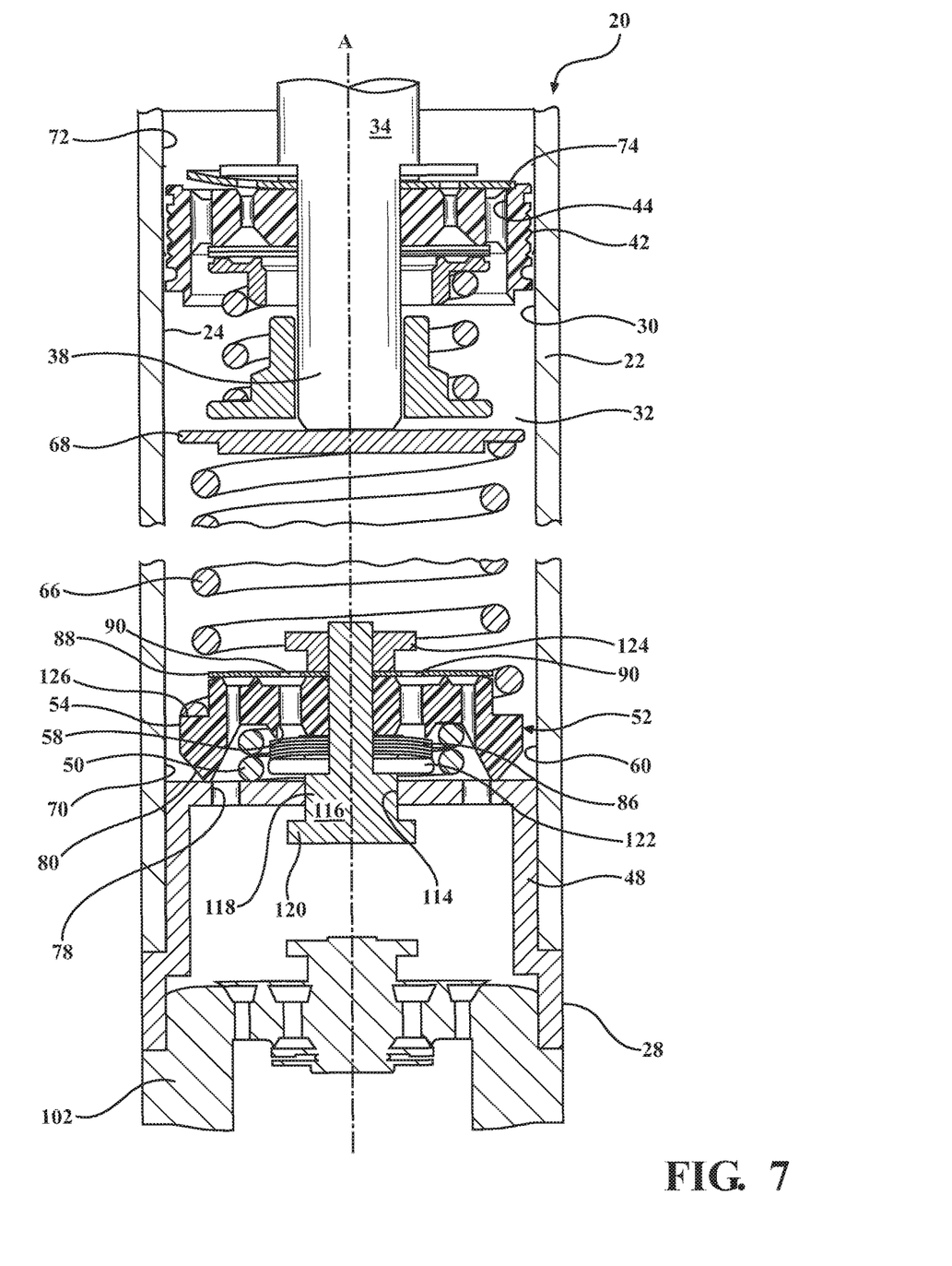
FIG. 7 is a cross-sectional view of the second embodiment of the damper assembly illustrating the valve body in sealing engagement with the insert.

The periphery 54 of the valve body 52 defines a valve body shelf 126 extending circumferentially. The second spring 66 engages the valve body 52 at the valve body shelf 126 and extends axially away from the valve body 52 toward the upper portion 26 of the first tube 22. The bumper 68 is attached to the second spring 66. As best shown in FIG. 7, the bumper 68 compresses the second spring 66 as the piston 42 approaches the lower portion 28 of the first tube 22 and engages the bumper 68. This compresses the first spring 50 and moves the valve body 52 into engagement with the insert 48 (FIG. 8) during the compression stroke of the piston 42.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A damper assembly comprising;
   a first tube having a generally tubular shape defining an inner surface and extending along an axis from an open upper portion to a closed lower portion to define a fluid chamber containing a damping fluid,
   a rod extending axially between a first end exteriorly of said first tube and a second end interiorly of said first tube, a guide annularly disposed about said rod and engaging said upper portion of said first tube for aligning said rod and sealing said damping fluid in said first tube, a piston defining a plurality of openings and attached to said second end of said rod and slidably disposed in said first tube and moveable toward said upper portion of said first tube in a rebound stroke and moveable toward said lower portion of said first tube in a compression stroke, a valve seat disposed in said first tube and extending radially outwardly from said axis, a first spring disposed in said first tube and engaging and extending axially away from said valve seat, a valve body annularly disposed about said axis in said first tube adjacent to said first spring and having a periphery and a top and a bottom and defining a plurality of bores extending axially through said valve body from said top to said bottom, a second spring disposed in said first tube and extending axially away from said top of said valve body toward said upper portion of said first tube, a bumper disposed in said first tube and engaging said second spring for compressing said second spring as said bumper moves axially in said first tube toward said lower portion of said first tube, characterized by said periphery of said valve body being spaced from said inner surface of said first tube to define an annular channel for allowing said damping fluid to bypass said valve body, and said valve body in sealing engagement with said valve seat in response to said bumper compressing said second spring and moving said valve body toward said lower portion of said first tube and into engagement with said valve seat to cause said damping fluid travelling through said annular channel to travel exclusively through said bores of said valve body thereby to provide additional damping force.

2. A damper assembly as set forth in claim 1 wherein said valve seat comprises a retainer attached to said second end of said rod adjacent to said piston and extending radially outwardly from said rod, said first spring annularly disposed about said rod extending axially away from said retainer and said piston, said valve body slidably disposed about said rod, said second spring concentrically disposed about said rod and extending axially away from said valve body, and said bumper slidably disposed about said rod for compressing said second spring as said piston approaches said upper portion of said first tube causing said bumper to engage said guide to compress said first spring and move said valve body into engagement with said retainer during the rebound stroke of said piston.

3. A damper assembly as set forth in claim 1 wherein said valve seat comprises an insert disposed in said lower portion of said first tube, said valve body disposed adjacent said insert, said first spring disposed between said valve body and said insert, said second spring extending axially away from said valve body toward said upper portion of said first tube, and said bumper engaging said second spring for compressing said second spring as said piston moves toward said lower portion of said first tube and engages said bumper and moves said bumper toward said insert to compress said first spring and move said valve body into engagement with said insert during the compression stroke of said piston.

4. A damper assembly as set forth in claim 1 wherein said bores of said valve body include a plurality of intake bores disposed circumferentially about said axis on an outer diameter and extending axially through said valve body and a plurality of deflection bores disposed circumferentially about said axis on an inner diameter and extending axially through said valve body with said inner diameter being disposed radially inwardly of said outer diameter.

5. A damper assembly as set forth in claim 4 further comprising a plurality of discs disposed annularly about said axis and extending radially from said axis over said bores of said valve body for flexing away from said bores in response to a difference in pressure between said top of said valve body and said bottom of said valve body as said valve body engages said valve seat.

6. A damper assembly as set forth in claim 5 wherein said discs include a plurality of deflection discs disposed annularly about said axis and extending radially from said axis over said deflection bores on said bottom of said valve body for flexing away from said bottom and said deflection bores in response to a first pressure differential from said top of said valve body to said bottom of said valve body as said valve body engages said valve seat.

7. A damper assembly as set forth in claim 6 wherein said discs include at least one intake disc disposed annularly about said axis on said top of said valve body and extending radially from said axis to cover said intake bores of said valve body for flexing away from said top and said intake bores in response to a second pressure differential from said bottom of said valve body to said top of said valve body as said valve body engages said valve seat.

8. A damper assembly as set forth in claim 7 wherein said intake disc defines a plurality of intake orifices disposed circumferentially about said axis and extending axially through said intake disc and axially aligned with said deflection bores for allowing said damping fluid flowing through said deflection bores to flow through said intake disc in response to a pressure differential from said top of said valve body to said bottom of said valve body as said valve body engages said valve seat.

9. A damper assembly as set forth in claim 8 wherein said piston divides said fluid chamber into a compression chamber with said lower portion and a rebound chamber with said guide in said upper portion and said openings of said piston extend parallel to said axis for allowing said damping fluid to flow through said piston between said compression chamber and said rebound chamber.

10. A damper assembly as set forth in claim 9 wherein said piston includes at least one regulator plate biased against said openings and disposed annularly about said rod for controlling flow of said damping fluid through said piston.

11. A damper assembly as set forth in claim 10 wherein said valve seat defines a plurality of passages extending axially through said valve seat to allow said damping fluid to flow through said valve seat and said valve body includes a tapered part extending axially away from said bottom at said periphery toward said valve seat.

12. A damper assembly as set forth in claim 11 wherein said bores of said valve body extend parallel to said axis.

13. A damper assembly as set forth in claim 12 further comprising a second tube having a generally tubular shape extending along said axis concentrically about said first tube.

14. A damper assembly as set forth in claim 13 wherein said valve seat comprises a retainer attached to said second end of said rod adjacent to said piston and extending radially outwardly from said rod to said inner surface of said first tube and defining a groove disposed annularly about said retainer,
- said damper assembly further including a base valve disposed adjacent said lower portion of said first tube and extending radially outwardly from said axis to engage and attach to said first tube,
- said damper assembly further comprising a spacer disposed between said piston and said retainer to maintain a predetermined distance between said piston and said retainer and to allow flexing of said regulator plate away from said piston,
- said damper assembly further comprising an O-ring annularly disposed about said retainer in said groove and a slide ring disposed in said groove concentrically about said O-ring and in sealing engagement with said inner surface of said first tube for preventing said damping fluid from passing between said retainer and said inner surface of said first tube,
- said rod defining a first shoulder abutting said retainer for limiting axial movement of said retainer away from said piston,
- said damper assembly further comprising a sleeve being generally cylindrically shaped and including a flange extending radially outwardly from said rod and slidably disposed about said rod and axially spaced from said retainer,
- said valve body and said intake disc and said deflection discs each disposed concentrically about said sleeve,
- said first spring annularly disposed about said rod and extending axially away from said retainer and said piston and engaging said flange of said sleeve,
- said damper assembly further comprising a second shoulder defined by said rod and abutting said sleeve for limiting the axial movement of said valve body away from said retainer,
- said damper assembly further comprising a clamping nut slidably disposed along said rod and attached to said sleeve opposite said first spring for retaining said intake disc against said top of said valve body and retaining said deflection discs between said flange of said sleeve and said bottom of said valve body,
- said clamping nut defining a clamping nut shelf extending circumferentially about said clamping nut,
- said second spring concentrically disposed about said rod and engaging and extending axially away from said clamping nut shelf along said rod toward said upper portion of said first tube, and
- said bumper slidably disposed about said rod for compressing said second spring as said piston approaches said upper portion of said first tube and causes said bumper to engage said guide to compress said first spring and move said valve body into engagement with said retainer during the rebound stroke of said piston.

15. A damper assembly as set forth in claim 13 wherein said valve seat comprises an insert having a cup shape and defining a central aperture and attached to said lower portion of said first tube,
- said damper assembly further comprising a base valve disposed adjacent said lower portion of said first tube and extending radially outwardly from said axis to engage and attach to said insert,
- said damper assembly further comprising an axial member having a protrusion slidably disposed in said central aperture of said insert and extending axially toward said upper portion of said first tube,
- said axial member having an annular projection extending radially from said protrusion and engaging said insert for limiting axial movement of said axial member toward said upper portion of said first tube,
- said first spring annularly disposed about said axial member and engaging and extending axially away from said insert,
- said damper assembly further comprising a washer annularly disposed about said axial member and adjacent said protrusion,
- said valve body and said intake disc and said deflection discs each disposed concentrically about said axial member,
- said periphery of said valve body defining a valve body shelf extending circumferentially,
- said second spring engaging said valve body at said valve body shelf and extending axially away from said valve body toward said upper portion of said first tube,
- said damper assembly further comprising a disc nut attached to said axial member and engaging said intake disc for retaining said intake disc against said top of said valve body and retaining said deflection discs between said washer and said bottom of said valve body, and
- said bumper attached to said second spring for compressing said second spring as said piston approaches said lower portion of said first tube and engages said bumper to compress said first spring and move said valve body into engagement with said insert during the compression stroke of said piston.

16. A damper assembly as set forth in claim 1 wherein said valve body includes a tapered part extending axially away from said bottom at said periphery toward said valve seat.

17. A damper assembly as set forth in claim 1 further comprising a second tube having a generally tubular shape extending along said axis concentrically about said first tube.

* * * * *